United States Patent [19]

Price et al.

[11] Patent Number: 4,459,859

[45] Date of Patent: Jul. 17, 1984

[54] FLOWMETER

[76] Inventors: Kenneth E. Price, 1534 Channelwood Dr., Whittier, Calif. 90601; Michael L. Schuman, 3216 Granada Ave., El Monte, Calif. 91732

[21] Appl. No.: 397,599

[22] Filed: Jul. 12, 1982

[51] Int. Cl.³ ............................................. G01F 1/22
[52] U.S. Cl. ................................. 73/861.54; 73/215
[58] Field of Search ..................... 73/202, 215, 861.54

[56] References Cited

U.S. PATENT DOCUMENTS

| | | | |
|---|---|---|---|
| 2,003,474 | 6/1935 | Schweitzer | 73/861.54 |
| 2,781,660 | 2/1954 | Gobel | 73/215 |
| 3,392,580 | 7/1968 | Bain et al. | 73/215 |
| 3,527,251 | 9/1970 | Hagstrom et al. | 73/215 |
| 3,559,482 | 2/1971 | Baker et al. | 73/202 |
| 3,603,148 | 9/1971 | Rikuta | 73/202 |
| 3,693,441 | 9/1972 | von Obstfelder | 73/861.54 |
| 3,882,724 | 5/1975 | Hearn | 73/215 |

FOREIGN PATENT DOCUMENTS 6713995  4/1968  Netherlands ................... 73/861.54

OTHER PUBLICATIONS

Industrial Laboratories, pp. 76, 77, 11/57.

*Primary Examiner*—Herbert Goldstein
*Attorney, Agent, or Firm*—Christie, Parker & Hale

[57] ABSTRACT

There is provided a flowmeter comprising a vertically extending inlet chamber having an inlet opening at its lower end, a vertically extending outlet chamber horizontally spaced-apart from the inlet chamber and having an outlet opening at its lower end, a communicating passage between the inlet and outlet chambers along the vertical length of the inlet chamber and a ball disposed in the inlet chamber and afforded slidable vertical movement therein. The flowmeter further comprises coaxially aligned inlet and outlet couplings for connecting the flowmeter to a horizontal fluid line.

3 Claims, 4 Drawing Figures

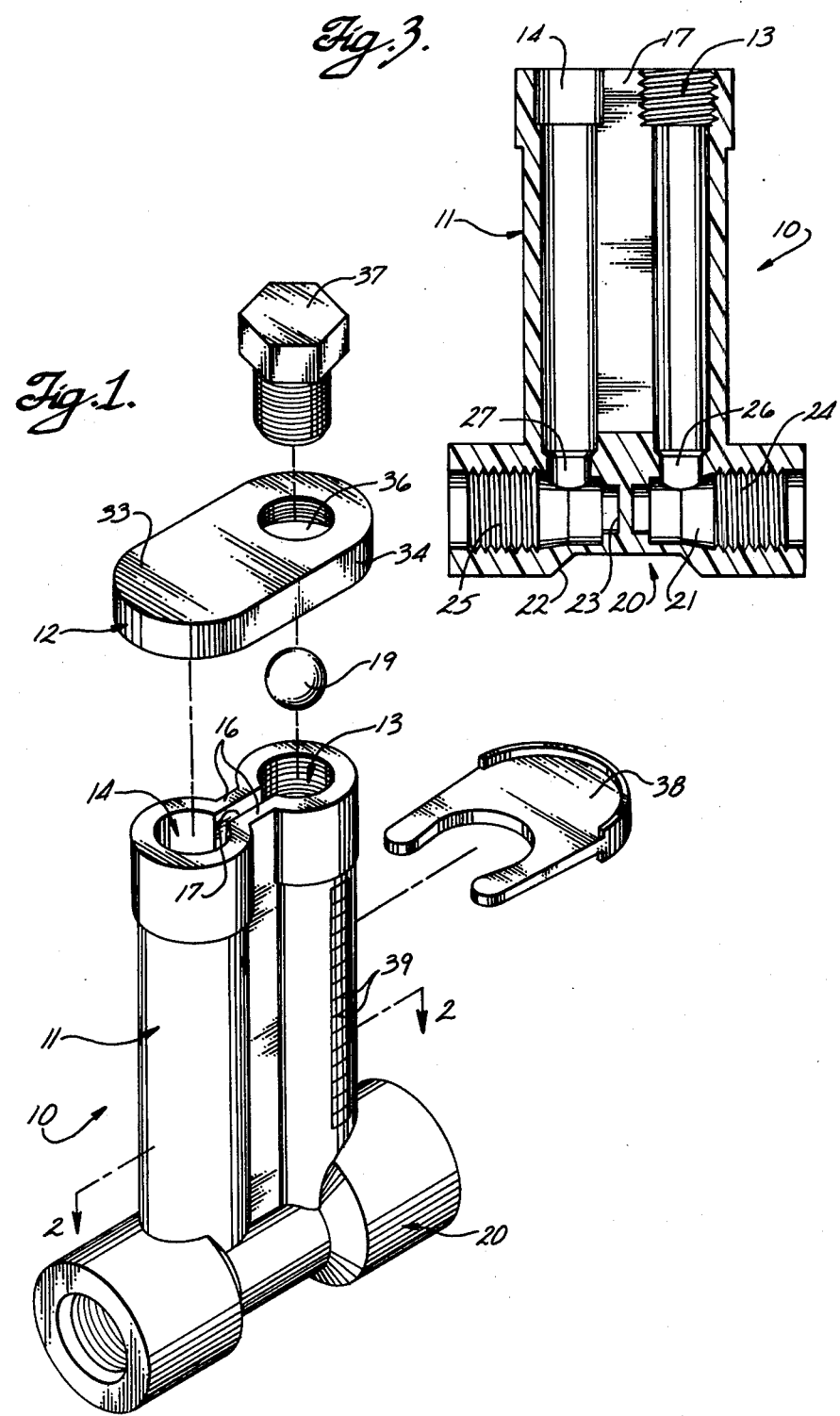

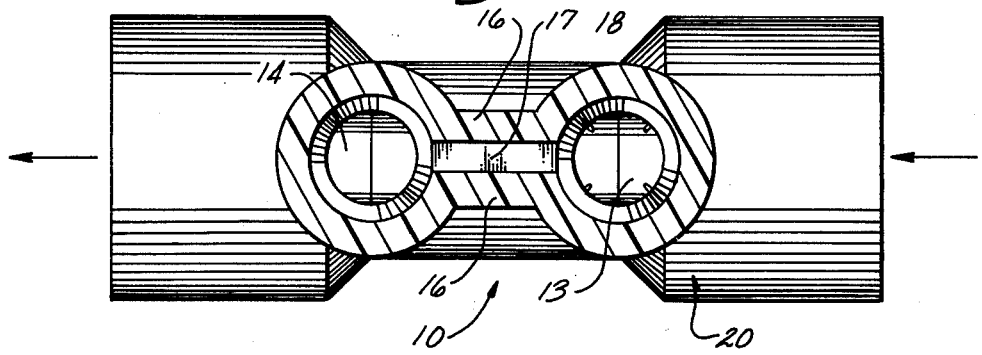
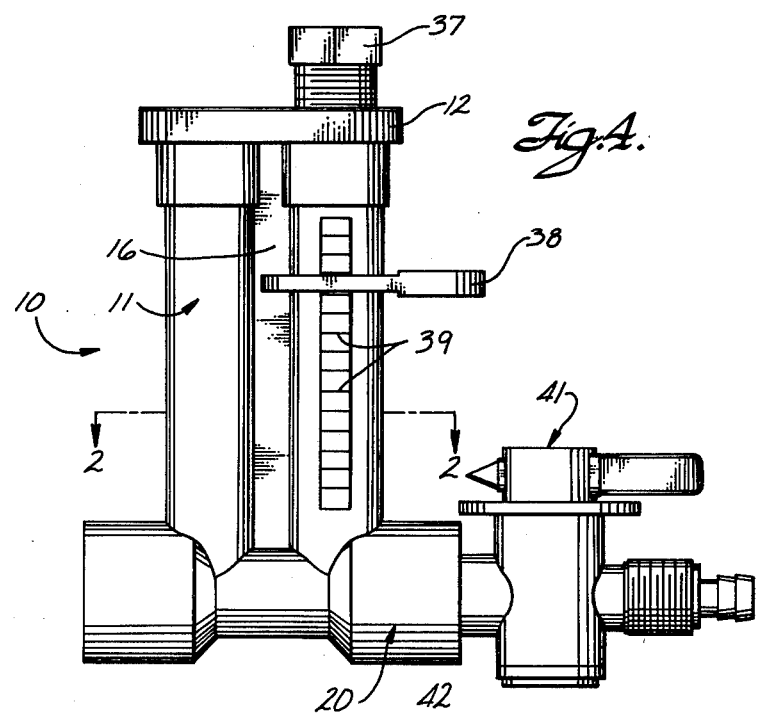

FLOWMETER

FIELD OF THE INVENTION

This invention relates to flowmeters and particularly to flowmeters applicable for use with swimming pool automatic chlorinators.

BACKGROUND OF THE INVENTION

Flowmeters have been used in a wide variety of applications for establishing, maintaining, and detecting the rate of flow of a fluid through a line, e.g., a pipe.

Conventional flowmeters typically comprise a transparent plastic housing having a vertically extending chamber with a circular transverse cross section. The chamber is tapered, having a larger diameter at its upper end than at its lower end. The flowmeter has an inlet opening at the lower end of the chamber and and outlet opening at the upper end. A plug, usually in the form of a ball, is disposed in the chamber and afforded vertical movement therein.

Fluid enters the flowmeter through the inlet opening at the bottom of the chamber, and flows upwardly through the chamber, pushing the plug upward until the diameter of the chamber becomes sufficiently large to enable the fluid to flow around the plug without forcing the plug to a higher position. The fluid then flows out the outlet opening. The vertical position of the plug is reflective of the flow rate.

In many flowmeters, vertical movement of the plug or ball is maintained along the vertical axis of the chamber by an axial wire guide extending through a hole in the middle of the plug. The upper and lower ends of the axial wire are anchored, typically by being embedded in the wall of the plastic housing.

Flowmeters having axial wire guides for the plugs have the advantage of enabling an even flow around the plug as it is pushed upward. However, such flowmeters also provide a disadvantage in that corrosion of the wire or plug, if a metal plug is used, or dirt or debris lodged between the plug and wire, can impede movement of the plug along the wire. This generates erroneous readings.

In addition, incorporation of an axial wire in the flowmeter adds to the cost of manufacturing the flowmeter, thereby increasing the cost to the consumer.

A disadvantage of flowmeters having tapered chambers is that the outlet opening is higher than an inlet opening and therefore extra plumbing is needed to mount the flowmeter onto an existing horizontal line.

SUMMARY OF THE INVENTION

There is provided a flowmeter comprising a housing having a translucent vertically extending chamber sealed at its upper end and having an inlet opening at its lower end. The chamber comprises an outlet opening along the vertical length of the chamber having a horizontal width less than the width of the chamber. A plug is disposed in the chamber and substantially obstructs flow of a fluid through the chamber.

The plug is afforded vertical movement such that when a fluid is passed through the flowmeter, the vertical position of the plug is dependent upon the rate of flow of the fluid.

In a preferred embodiment of the invention, the flowmeter comprises a housing having a translucent, vertically extending inlet chamber and a horizontally adjacent, vertically extending outlet chamber, an inlet opening at the base of the inlet chamber and an outlet opening at the base of the outlet chamber, and a passage having a horizontal width less than the horizontal width of the inlet chamber between the inlet and outlet chambers along their lengths. The flowmeter further comprises a plug disposed in the inlet chamber.

In a particularly preferred embodiment of the invention, the housing of the flowmeter comprises a pair of horizontally spaced-apart, generally vertical cylindrical chambers having about the same length. One chamber is a translucent inlet ball chamber and the other chamber is the outlet chamber. The housing comprises a generally circular inlet opening at the bottom of the inlet ball chamber and an outlet opening at the bottom of the outlet chamber.

A ball is disposed in the inlet ball chamber and afforded slidable vertical movement with the inlet ball chamber.

The inlet ball chamber and outlet chamber communicate with each other along their lengths from a position near their lower ends above the inlet opening to their upper ends by means of a slot-like passage through the wall of the housing separating the inlet ball chamber and outlet chamber. The cross-sectional horizontal width of the slot-like passage is less than the diameter of the ball.

A fluid entering the inlet chamber through the inlet opening passes upward in the inlet ball chamber and through the passage into the outlet chamber and then through the outlet opening.

When the fluid enters the inlet chamber in an upward direction, it pushes the ball, which obstructs passage of fluid through the inlet ball chamber, upwardly. As the ball is pushed above the lower end of the slot-like passage, the fluid flows through the passage into the outer chamber. As the flow rate increases, the ball is pushed farther upward in the inlet chamber. At a select flow rate, the vertical position of the ball in the inlet ball chamber will be reflective of that flow rate.

The flowmeter further may comprise a clip mountable on the exterior of the housing to mark the vertical position of the ball at a select level and a removable plug at the top of the inlet chamber. Removal of the plug provides access to the inlet chamber for cleaning purposes.

BRIEF DESCRIPTION OF THE DRAWINGS

These and other features and advantages of the present invention will be better understood by reference to the following detailed description when considered in conjunction with the accompanying drawings wherein:

FIG. 1 is an exploded view of a preferred flowmeter;

FIG. 2 is a horizontal cross-sectional view through the inlet and outlet chambers;

FIG. 3 is a vertical cross-sectional view through the inlet and outlet chambers; and FIG. 4 is a front view of a preferred flowmeter and a regulator valve.

DETAILED DESCRIPTION

The present invention is particularly suited for use with automatic chlorinators which are used to maintain a select level of chlorine in swimming pools, spas and hot tubs.

Automatic chlorinators generally contain a chamber which is filled or partially filled with a solid chlorine-containing substance, that, when dissolved in water, produces soluble chlorine. Water is pumped through the chamber to dissolve a select amount of the solid chlorine-containing substance and then into the pool. The amount of the chlorine-containing substance that is dissolved is selected to provide sufficient chlorine in the pool to prevent algae growth and will depend on various factors including the size of the pool, temperature of the pool, the amount of use that the pool receives, the amount of sunlight on the pool and the amount of dissolved oxygen in the pool water.

To dissolve a predetermined select amount of chlorine-containing substance, the contact time between the solid chlorine-containing substance and the water and the volume of water pumped through the chamber is adjusted to dissolve that select amount. The contact time varies according to the volume of water in contact with the chlorine-producing substance, the total amount of chlorine-containing substance in the chamber in contact with the water, and the particle size of the chlorine-containing substance.

The contact time required for a particular chlorinator is adjusted by regulating the flow rate of the water through the chlorinator which is achieved by adjusting a regulator valve in the chlorinator water line. Once it is adjusted, the flow rate is maintained at that constant level. For most swimming pools, the flow rates are in the range of from 0 to 1 gallons per minute.

To maintain a constant flow rate through the chlorinator, a flowmeter constructed according to the principles of this invention is positioned in the water line. The flowmeter enables visual detection of the flow rate and the need, if any, for adjustment.

In preferred pool systems, there are two locations in which the flowmeter and chlorinators are used. In each, the flow of water through the flowmeter and chlorinator is parallel with the flow of water through a major or principal pipe. A small diameter line is tapped into the principal water pipe at two locations, one upstream from the other so that a portion of the water flowing through the principal pipe flows into and through the small diameter line and then back into the principal pipe. The flowmeter and chlorinator are mounted along the small diameter line. Also mounted along the small diameter line is a regulator valve for adjusting the flow rate through the small diameter line. In a preferred system, the regulator valve is mounted upstream from the flowmeter, which is mounted upstream from the chlorinator. The flowmeter and valve are used to establish and maintain the flow through the small diameter line; such corrections or adjustments as may be needed in the flow rate are made by manually adjusting the regulator valve.

In a pool system having no heater, the flowmeter and chlorinator are generally positioned between the pump for the pool system and the filter, i.e., the small diameter line is tapped into the principal pipe between the pump and filter. In such an arrangement, as a filter gets dirty and clogged, its resistance to water flow increases, and so the pressure in the principal pipe increases, which causes the flow through the chlorinator to increase. Examination of the flowmeter allows detection of the increase in the flow rate. The regulator valve is then manually adjusted to maintain the desired flow rate.

In pool systems that include a heater, the heater is generally positioned subsequent to the pump and filter. In such systems, it is generally convenient for the flowmeter and chlorinator to be mounted between the filter and heater, i.e., mounted on a small diameter water line tapped into and flowing parallel to the principal water pipe between the filter and the heater. In this arrangement, as a filter becomes dirty and clogged, the water pressure and flow rate in the principal pipe after the filter decreases. This also results in a decreased flow rate through the chlorinator. Again, the change in flow rate is detectable by visual examination of the flowmeter. Manual adjustment of the regulator valve is made to maintain the desired flow rate.

A preferred embodiment of a flowmeter constructed according to principles of the present invention is shown in FIGS. 1 and 2. Flowmeter 10 comprises a clear, plastic housing comprising two injection-molded plastic pieces, a body 11 and a cap 12. The body 11 of the housing defines a generally vertical cylindrical inlet ball chamber 13 and a generally vertical cylindrical outlet chamber 14. Chambers 13 and 14 preferably have parallel axes and have substantially the same vertical length. The chambers are separated by a pair of spaced-apart, preferably parallel connecting walls 16. The connecting walls 16 extend the vertical length of the inlet ball chamber and outlet chamber and are integral (i.e., intersect) along their vertical edges with the wall of the inlet ball chamber on one side and the wall of the outlet chamber on the other.

The inlet ball chamber 13 and the outlet chamber 14 each communicate along their entire lengths with the space between the connecting walls 16. The space between the connecting walls therefore forms a slot-like passage 17 between the inlet ball chamber and the outlet chamber.

Injection-molded plastic parts having cylindrical chambers, such as the inlet ball chamber and the outlet chamber, require a slight draft or taper of the cylindrical chamber walls to facilitate removal of the hardened plastic part from the mold. In the preferred embodiment, the draft angle of the inlet wall chamber and outlet chamber is minimized and is generally about 0.5°. To essentially eliminate the draft angle, the housing body can be molded in two essentially identical halves and joined by suitable means.

To compensate for the draft angle, the inlet ball chamber defines four thin ribs 18 extending vertically the length of the inlet ball chamber. The ribs 18 extend radially inwardly a short distance from the inner surface of the inlet ball chamber wall. The interior edges of the ribs are essentially parallel to the vertical axis of the inlet ball chamber and define a slightly smaller cylinder than the inlet ball chamber. The ribs have essentially no draft angle and therefore the defined cylinder has essentially no draft or taper. The total surface area of the ribs is sufficiently small not to cause the hardened molded part to stick to the mold and make removal from the mold more difficult.

The ribs act as a guide for vertical movement of a ball 19, which is disposed in the inlet ball chamber, so that movement of the ball will generally only be along the vertical axis of the inlet ball chamber.

Flowmeter body 11 defines a flow line coupling structure 20 at the lower end of the body. The coupling structure defines an inflow chamber 21 and an outflow chamber 22 which are coaxially aligned in the structure on opposite sides of a partition 23 which preferably is molded integral with the body and which isolates such chambers from each other. The axis along which the inflow and outflow chambers are aligned preferably is perpendicular to the axes of chambers 13 and 14.

Internal threads 24 are defined in the walls of inflow chamber adjacent its outer open end, opposite from partition 23, to adapt the inflow chamber to be connected to the threaded end of a suitable flow line, such as the small diameter line associated with the chlorinator mentioned above, or to any other desired device such as regulator valve 42 shown in FIG. 4. Similar internal threads 25 are defined in the walls of the outflow chamber adjacent its open outer end for similar purposes.

Ports 26 and 27 are defined by body 11 to communicate inflow chamber 21 to ball chamber 13, and to communicate outlet chamber 14 to outflow chamber 22, respectively. The ports are located between the lower ends of vertical chambers 13 and 14 and the inner ends of chambers 21 and 22, respectively. Port 26 has a diameter less than that of ball 19 to maintain the ball in its chamber 13.

Flowmeter 10 includes a cap 12 which closes the upper ends of inlet ball chamber 13, passage 17 and outlet chamber 14. The cap 12 is assembled onto the top of the housing body and is fixedly attached thereto by suitable means such as application of a suitable solvent or ultrasonic welding.

The cap comprises a generally flat, oval top plate 33 and a short side wall 34 extending downward from the top plate along the perimeter of the top plate. The cap further comprises a hole or opening 36 through the top plate at a position that, when the cap is assembled onto the housing body, is directly above the inlet ball chamber and provides access to the inlet ball chamber. The diameter of the hole 36 is approximately equal to the inner diameter of the inlet ball chamber.

The cap 12 fits over the upper portion of the housing body such that the side wall 34 of the cap is in contact with portions of the upper ends of the inlet ball chamber wall and the outlet chamber wall. The side wall thus facilitates assembly of the cap onto the housing body by automatically positioning the hole in the top plate over the inlet ball chamber.

The flowmeter comprises a ball 19 which is disposed in the inlet ball chamber 13. The diameter of the ball is slightly less than the diameter of the cylinder defined by the inner edges of the ribs 18 and is sufficiently large to substantially obstruct the flow of water through the inlet ball chamber. The ball 19 is afforded slidable vertical movement along the length of the inlet ball chamber, the ribs 18 acting as a guide to keep the ball centered in the inlet ball chamber.

In the presently preferred chlorinator flowmeter shown in the drawings, ball 19 has a density greater than that of water. However, the ball density is not sufficiently great to significantly restrict the flow of water through the flowmeter, i.e., the weight of the ball is insufficient to significantly reduce the flow rate. Preferably the ball is made of tetrafluoroethylene.

The flowmeter also comprises a plug 37 insertable into the hole in the top plate of the cap to seal the upper end of the inlet ball chamber. The plug can be removed to provide access to the inlet ball chamber so that such chamber may be cleaned, when necessary. In a particularly preferred embodiment, the wall of the housing cap defining the hole 36 and a portion of the inlet ball chamber wall adjacent the cap are tapped after connection of cap 12 to body 11. A corresponding threaded plastic plug is then screwed into the cap hole and the inlet ball chamber to seal the upper end of the inlet ball chamber. In an alternative arrangement, the cap comprises an upwardly extending boss around the perimeter of the hole. This provides the cap with a greater thickness in this area and hence only the hole in the cap need be threaded. Either of these arrangements provide a securely anchored plug that is also easily removed.

In use, water flowing through the water line flows horizontally into inflow chamber 21, then vertically through port 26, and into inlet ball chamber 13. The ball obstructs the inlet ball chamber and is therefore pushed upward by the water in response to a combination of buoyant and viscous drag forces applied to the ball by the water. Movement of the ball upwardly in chamber 13 exposes a portion of passage 17 between the inlet ball chamber and the outlet chamber and the water flows through the passage into the outlet chamber and exits the flow meter through part 27 and outflow chamber 22.

The ball is pushed upward in chamber 13 by the water flowing into and through that chamber to a level where the downward force on the ball due to gravity is balanced by the upward forces applied to the ball by the water. Since the ball substantially obstructs the inlet ball chamber and the only effective outlet from the inlet ball chamber is via passage 17, the ball will assume a position in chamber 13 which is determined by the interrelation of the forces acting on the ball and by the effect of water flow through passage 17 into chamber 14.

A change in the flow rate of water into and through chamber 13 causes the ball to move vertically in chamber 13 until a new balance of forces on the ball is established.

The vertical position of ball 19 in chamber 13 is thus a function of the flow rate of water into and through that chamber. The flow rate can be maintained at a select constant level by adjusting the regulator valve, so that the vertical position of the ball remains constant.

A movable clip 38, mountable on the exterior of the inlet ball chamber, is provided to mark the position of the ball for a select flow rate. To assist in maintaining the clip at the marked level, the exterior surface of the wall of the inlet ball chamber defined a series of vertically spaced-apart, generally horizontal ribs 39. The clip is mounted on the housing so that a portion of the clip is positioned between adjacent ribs. The ribs extend outwardly sufficiently to substantially prevent vertical movement of the clip without a manually-applied force on the clip. However, the ribs are sufficiently low so that the clip can be forced over the ribs manually and thereby moved vertically.

The clip member 38 is especially useful in the presently preferred flowmeter for use in a water circulating and treatment system for a swimming pool or spa. Such systems include a filter which, with operation of the system, becomes dirty and requires periodic cleaning. Depending upon the relative locations of the flowmeter and the filter in such a system, increased dirtiness (clogging) of the filter has one or the other of two effects upon the effective water flow rate through the flowmeter and the chlorinator with which the flowmeter preferably is associated.

Cleaning of the filter usually requires that the circulating pump of the system be shut down during the cleaning operation. After the filter has been cleaned, the pump is put back into operation. Because the filter is now clean and has minimum resistance to flow of water through it, the water flow rate through the flowmeter will be different after cleaning than just before cleaning of the filter. Use of the clip member on the flowmeter to indicate the desired flow rate through it, regardless of the state of the filter, makes it easy to readjust the system after filter cleaning to establish the desired flow rate.

In a particularly preferred embodiment of the invention, as shown in FIG. 4, flowmeter 10 and a regulator valve 41 comprise a functional unit. In such a unit, the regulator valve 41 defines an externally threaded outlet coupling 42 which is threaded into threads 24 of the flowmeter inflow chamber.

The present invention is applicable to systems involving fluids other than water. To accommodate lighter fluids, including gases, a ball of lighter density is used. Likewise, if a liquid heavier than water is used, a ball having a heavier density, i.e., greater than the liquid, is used.

In addition, the size of the flowmeter can be scaled up to accommodate liquid flow rates greater than one gallon per minute.

This invention provides the advantage of having both inlet and outlet couplings in a single horizontal line. This means that the flowmeter can be mounted easily onto a horizontal pipe, tube or other line. In addition, the flowmeter requires no axial wire guides and therefore is less expensive to manufacture.

There are other advantages provided by a flowmeter of this invention. The presence of partition 23 between coaxially aligned inflow chamber 21 and outflow chamber 22 enables the use of a single style or size of housing, preferably made by injection molding processes, in the manufacture of a series of flowmeters, each having a characteristic flow rate range. As noted above, the presently preferred form of this invention is as shown in the drawings of a flowmeter useful with a swimming pool or spa chlorinator in which the waterflow rate through the flowmeter is in the range of 0 to 1 gallons per minute. The same flowmeter housing molding can be used in the manufacture of a flowmeter for a somewhat higher range of flow rates merely by drilling a suitable hole axially through partition 23 to convert chambers 21 and 22 into components of an orifice-regulated bypass passage in the housing functionally parallel to the flow path through chamber 13, passage 17 and chamber 14. Depending upon the size of the orifice aperture in partition 23, additional flowmeters useful to monitor flow rates in ranges of, say, 1 to 3 gpm, 3 to 5 gpm, and so on, can be provided through a series of ranges limited only by the complete elimination of partition 23 from the housing. The coaxial relation of chambers 21 and 22 provides this versatility by enabling access to partition 23 for formation of the desired orifice.

It is thus apparent that a small number of differently sized flowmeter housing moldings can be used to provide a large number of discrete flowmeters, each having its own flow rate range. The manufacturing advantages and efficiencies thus made possible are readily apparent.

It is also within the scope of this invention that a valve, such as a simple rotary plug valve, can be incorporated into the flowmeter housing in place of partition 23 to provide a single flowmeter structure adjustable for use in a flow system having differing desired flow rates at different times. Such an adjustable flowmeter would be operable between states corresponding to the presence of partition 23 in flowmeter 10, at one extreme, to the complete absence of the partition, at the opposite extreme.

The presently preferred chlorinator flowmeter incorporates a body molded of acrylic polymer, namely CP-923 resin obtained from Continental Polymers, Inc. If the flowmeter is to be used with a corrosive liquid, the body can be molded from a corrosion-resistant resin, such as clear polypropylene. If desired, the body can be made translucent rather than transparent, and a colored ball can be used.

Another advantage of the present flowmeter structure can be realized in those situations where the liquid flow rate into and through chamber 13 is insufficient to cause the liquid to rise to the top of the chamber. The advantage is that, by use of a low density ball, the flowmeter can be made insensitive to liquid specific gravity. It was noted above that where, as presently preferred, ball 19 is made of tetrafluoroethylene, having a specific gravity greater than 1.0, the position of the ball in chamber 13, for a given flow rate of water through the chamber, is dependent upon a combination of forces, namely viscous drag and buoyant forces. If the ball is defined to have an overall specific gravity less than that of any liquid to be passed through the flowmeter, the ball will float on the surface of the liquid column in chamber 13, regardless of the specific gravity of the liquid. Thus, the ball used in a flowmeter of this invention can have a gross (overall) specific gravity either greater than, equal to, or less than that of the fluid applied to the flowmeter, as desired.

The preceding description has been presented with reference to the presently preferred embodiment of the invention shown in the accompanying drawings. Workers skilled in the art and technology to which this invention pertains will appreciate that alterations and changes in the described apparatus and structure can be practiced without meaningfully departing from the principles, spirit and scope of this invention. Accordingly, the foregoing description should not be read as pertaining only to the precise structures and precedures described, but rather should be read consistent with and as support for the following claims which are to have their fullest fair scope.

What is claimed is:

1. A flowmeter for monitoring the flow rate of a liquid passing through a generally horizontal fluid line comprising:

a housing comprising a body and a cap wherein:

the body defines:

a translucent, generally vertically extending, substantially cylindrical inlet ball chamber having a plurality of ribs extending radially inwardly a short distance from the inner surface of the wall of the inlet ball chamber along the vertical extent of the inlet ball chamber, the ribs having inner edges essentially parallel to the axis of the inlet ball chamber and defining a ball race;

an inlet coupling capable of being connected to a first section of a generally horizontal fluid flow line;

a generally circular inlet opening having a diameter less than the diameter of the inlet chamber communicating between the inlet chamber and the inlet coupling;

a generally vertically extending outlet chamber, laterally adjacent to the inlet chamber;

an outlet coupling capable of being connected to a second section of the fluid flow line, co-linear with the first section;

an outlet opening communicating between the outlet chamber and the outlet coupling; and a communicating flow passage between the inlet chamber and the outlet chamber extending along the vertical extents of the inlet chamber and the outlet chamber and having a flow width less than the diameter of the inlet chamber;

the cap comprises a generally flat top plate mountable to the body for enclosing the top ends of the inlet ball chamber, the outlet chamber and the passage;

a ball having a diameter greater than the flow width of the passage and a selected net density disposed in the inlet chamber and afforded slidable vertical movement along the ball race; and a clip member mountable on the housing for marking a select vertical level of the inlet ball chamber.

2. A flowmeter as claimed in claim 1 wherein the cap comprises an opening above the inlet ball chamber and the flowmeter further comprises a closure member removably disposed in and sealing the cap opening.

3. A flowmeter as claimed in claim 2 wherein the cap opening and the closure member are cooperatively threaded.

* * * * *